(12) United States Patent
Binkert

(10) Patent No.: US 10,590,969 B2
(45) Date of Patent: Mar. 17, 2020

(54) DEVICE FOR HOLDING A COMPONENT

(71) Applicant: A. Raymond et Cie, Grenoble (FR)

(72) Inventor: Sven Binkert, Lörrach (DE)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 15/747,134

(22) PCT Filed: Jul. 18, 2016

(86) PCT No.: PCT/EP2016/001250
§ 371 (c)(1),
(2) Date: Jan. 23, 2018

(87) PCT Pub. No.: WO2017/016651
PCT Pub. Date: Feb. 2, 2017

(65) Prior Publication Data
US 2018/0209454 A1    Jul. 26, 2018

(30) Foreign Application Priority Data

Jul. 24, 2015  (DE) .......................... 10 2015 009 366

(51) Int. Cl.
*F16B 2/24*  (2006.01)
*F16B 21/08*  (2006.01)
(Continued)

(52) U.S. Cl.
CPC .............. *F16B 2/245* (2013.01); *B25B 11/00* (2013.01); *F16B 5/0642* (2013.01);
(Continued)

(58) Field of Classification Search
CPC ........ B25B 11/00; F16B 21/086; F16B 2/245; F16B 33/006; F16B 5/0635; F16B 5/0642
See application file for complete search history.

(56) References Cited

U.S. PATENT DOCUMENTS 2,526,532 A   10/1950   Bedford, Jr.
2,579,279 A   12/1951   Tinnerman
(Continued)

FOREIGN PATENT DOCUMENTS

CN    1224487 A    7/1999
CN    1824524 A    8/2006
(Continued)

OTHER PUBLICATIONS

Machine assisted English translation of DE102012212508A1 obtained from https://patents.google.com on Sep. 12, 2019, 7 pages.

*Primary Examiner* — Robert Sandy
*Assistant Examiner* — David M Upchurch
(74) *Attorney, Agent, or Firm* — Warner Norcross + Judd LLP

(57) ABSTRACT

The invention includes a clip having a head and at least one clip surface for abutment against the component or an element on which the component is to be held. The at least one clip surface faces the head and is spaced apart therefrom. The head exhibits a head-side surface and is joined with one or more arms designed for abutment against the opposite side of the component provided for the at least one clip surface to abut against or the element on which the component is to be held. The head-side surface has a head-bending section joined with an arm, wherein a connection between the head bending section and arm encompasses another bending section which runs at an angle in excess of 0° relative to the bending axis of the head bending section, and/or the head-side surface is joined with a leg.

20 Claims, 8 Drawing Sheets

(51) Int. Cl.
  *B25B 11/00* (2006.01)
  *F16B 5/06* (2006.01)
  *F16B 33/00* (2006.01)

(52) U.S. Cl.
  CPC .......... *F16B 21/086* (2013.01); *F16B 5/0635* (2013.01); *F16B 33/006* (2013.01)

(56) References Cited

U.S. PATENT DOCUMENTS

| | | | | |
|---|---|---|---|---|
| 4,925,351 | A * | 5/1990 | Fisher | F16B 37/043 411/182 |
| 6,976,292 | B2 * | 12/2005 | MacPherson | B60N 3/026 24/292 |
| 7,874,775 | B2 * | 1/2011 | Hullmann | B60R 11/00 24/295 |
| 8,016,530 | B2 * | 9/2011 | Johnson | F16B 37/043 411/173 |
| 8,646,155 | B2 * | 2/2014 | Ribes Marti | F16B 2/241 24/295 |
| 2005/0271492 | A1 * | 12/2005 | Jackson, Jr. | F16B 21/076 411/112 |
| 2013/0302087 | A1 * | 11/2013 | Binkert | F16B 2/243 403/345 |
| 2015/0300388 | A1 * | 10/2015 | Maschat | B60R 21/20 24/458 |

FOREIGN PATENT DOCUMENTS

| | | |
|---|---|---|
| CN | 101432532 A1 | 5/2009 |
| CN | 103286703 A | 9/2013 |
| CN | 103348145 A | 10/2013 |
| CN | 103717378 A | 4/2014 |
| CN | 206216531 U | 6/2017 |
| DE | 202010004995 U1 | 9/2011 |
| DE | 102012212508 A1 | 5/2014 |
| EP | 2220384 A2 | 8/2010 |
| GB | 657791 A | 9/1951 |
| WO | 2010055485 A1 | 5/2010 |
| WO | 2012104250 A1 | 8/2012 |
| WO | 2012166552 A1 | 12/2012 |

* cited by examiner

DEVICE FOR HOLDING A COMPONENT

TECHNICAL FIELD OF THE INVENTION

The invention relates to a device for holding a component, wherein the device encompasses a clip, which has a head and one or more clip surfaces for abutment against the component to be held or an element on which the component is to be held, wherein the clip surface faces the head, and is spaced apart from the head, and the head exhibits a head-side surface, and is joined with one or more arms, which are designed for abutment against the opposite side of the component to be held provided for the clip surface to abut against or the element on which the component is to be held.

BACKROUND OF THE INVENTION

Known from WO 2012/104250 A1 is a fastening device, which in a head area has a flat cover plate with an essentially rectangular shape. Spring arms are molded onto the cover plate at the ends of the cover plate, which extend away from the cover plate in the direction of a foot area lying opposite the head area. The spring arms molded onto the cover plate require that the cover plate be enlarged, so that the spring arms joined with the cover plate can be formed thereon.

Known from DE 20 2010 004 995 U1 is a device for holding a component. The device encompasses a clip, which exhibits a head and one or more clip surfaces for an abutment against a component to be held or an element on which the component is to be held. The clip surface faces the head and is spaced apart from the head. The head exhibits a head-side surface, and is joined with several arms, which are designed for abutment against the opposite side of the side of the component to be held or the element on which the component is to be held, which is provided for the abutment of the clip surface. The head-side surface has formed upon it a head bending section, which is joined with an arm, wherein the connection between the head bending section (23) and arm (24) encompasses another bending section (25), which is bent around the bending axis running at an angle in excess of 0° relative to the bending axis of the head bending section. The head bending section is bent away from the clip surface (22; 122), so that a section adjoining the head bending section extends over the head-side surface. This is disadvantageous, since it does not allow direct access to the head-side surface, for example to insert the device.

BRIEF SUMMARY OF THE INVENTION

The object of the invention is to provide a device for holding a component, which enables easier handling while maintaining a constant quality with respect to how holding is configured.

The object is achieved by the subject matter of the independent claims. Advantageous embodiments are indicated in the subclaims and the following description.

The invention proceeds from the basic idea of furnishing a connection for an arm with a head-side surface of the device in such a way that, in order to establish the connection with the arm, a first bend is introduced on the head-side surface of the device under the head of the device and/or a first bend is provided to join an arm to a leg extending from the head-side surface laterally to the head. It was found that a bend having this configuration and joined with another bend exhibiting a bending axis not running parallel to the first bend results in a smaller head area or a head area that need not be significantly enlarged relative to known head areas. Given the lack of enlargement of the head-side surface, the device cannot exhibit any enlarged dimensions, so that the device can also continue to be used in conventional or smaller recesses. The head-side surface can be diminished by up to 25% in comparison to the fastening device known from WO 2012/104250 A1. In addition, the configuration according to the invention prevents the head of such a device from having to become larger in the longitudinal extension, i.e., in height, by comparison to known devices as the result of joining the head-side surface with an arm. Furthermore, connecting the head-side surface with an arm in this way enables an activation of the device via the head-side surface, e.g., so as to press the device into a recess, wherein the head-side surface need not be enlarged with regard to the base area.

The invention creates a device for holding a component, wherein the device encompasses a clip that exhibits a head and one or more clip surfaces for abutment against the component to be held or an element on which the component is to be held. The clip surface faces the head, and is spaced apart from the head. The head exhibits a head-side surface, and is joined with one or more arms, which can be elastic in design, and are designed for abutment against the opposite side of the component to be held provided for the clip surface to abut against or the element on which the component is to be held. The head-side surface can have formed upon it a head bending section, which is bent around a first bending axis and bent in the direction toward the end of the device spaced apart from the head, and which is joined with an arm, wherein the connection between the head bending section and arm encompasses another (second) bending section, which is bent around a bending axis that runs at an angle of more than 0° relative to the first bending axis of the head bending section. The shoulder for the arm relative to the head-side surface can thus be present under the head-side surface. Alternatively or additionally, it can be provided that the head-side surface be joined with a leg, which extends at an angle of more than 0° relative to the head-side surface, and has formed upon it a leg bending section that is bent around a first bending axis and joined with an arm. The arm can here be joined with the leg bending section by means of another bending section, which is bent around a second bending axis that runs at an angle of more than 0° relative to the first bending axis of the leg bending section. The shoulder for the arm relative to the head-side surface can thus be located laterally from the head-side surface. The elasticity of the arm can arise from the one or more bending sections or the shape of the arm or the shape of a connection between the arm and head side surface. Alternatively or additionally, the elasticity can stem from the material used for the arm. The arm can be an elastic arm.

The term "head bending section" encompasses a bending section that is indirectly, in particular directly, joined with the head-side surface. The head bending section preferably directly borders the head-side surface. The head bending section is thus a bent section that directly adjoins the head-side surface. It is bent around a first bending axis. The term "leg bending section" encompasses a bending section that is indirectly, in particular directly, joined with the leg, which in particular is situated laterally to the head-side surface. The leg bending section indirectly or directly borders the leg. The leg bending section is bent around a first bending axis. If the additional bending section used to join the arm with the head bending section or leg bending section is bent around a second bending axis that runs at an angle of more than 0° relative to the first bending axis of the head bending section, this is understood to mean that the bending axis of the head bending section or leg bending section does not run parallel to the bending axis of the additional bending axis. With respect to the head-side surface, two bends must be implemented in the space with a varying bending axis, which run along the flat elements of the device from the head-side surface to the arm.

The term "holding" the component encompasses the suitability of the device to be joined with the component, and in particular the suitability of the device to hold the component on an element to which the component is to be held. The term "holding" encompasses preventing a movement by the component relative to an element on which the component is to be held in the area of the device, in particular a movement along a shaft axis of the device in both directions. In the device according to the invention, the suitability for "holding" the component arises from the at least one clip surface and its alignment relative to an arm. The clip exhibits a clip surface that points at least essentially toward the arm, or at least has a component of the surface normal that points in the direction toward the arm. The job of the clip surface and arm can be to hold the component. The component to be held can come to abut against both a clip surface and an arm. The clips surface and arm can abut against varying surfaces of the component. Since the clip surface points at least essentially toward the arm, or a component of its surface normal points in the direction toward the arm, abutting the component to be held against the clip surface prevents the component from being able to move further in the direction away from the arm or in the direction toward the clip surface and vice versa. For example, the device can pass through an opening in the element on which the component is to be held, and hold the component via clamping by having a section of the component come to abut against the element on which the component is to be held, and by having the device come to abut with its clip surface(s) against the element and with its arm(s) against the component, wherein the arms spring back slightly, thereby generating the clamping force. For example, the component can be an airbag, and the element on which the component is to be held can be a body part of a vehicle. However, the device can also hold the component only between the clip surface(s) and arm(s), and the head of the device can be fastened, in particular welded, adhesively bonded, clipped, plugged or screwed, to an element on which the component is to be secured. In like manner, the device can hold the element on which the component is to be fastened solely between the clip surface(s) and arm(s), and the head can be fastened, in particular welded, screwed, clipped, plugged or adhesively bonded, to the component.

The device or clip can at least partially extend through a mounting recess of the component to be held and/or a mounting recess of the element to which the component is to be fastened. The mounting recess can essentially have a shape adjusted to the outer contour of the clip, which can essentially be rectangular.

For example, in the sense of the invention, the term "component" encompasses a panel or plate to be fastened to a vehicle body, in particular a body panel. In the sense of the invention, a component can in particular involve an airbag module in the automobile area, i.e., a head, side, knee, pedestrian, front or rear airbag.

In the sense of the invention, the term "facing" in relation to two surfaces or sections of two surfaces means that the surface normal of the considered surfaces or sections of surfaces include an angle of less than 45° with each other.

In the sense of the invention, the term "in the direction" as relates to a movement encompasses a movement that has a directional component parallel to the direction. The term "in the direction" does not necessarily imply just a translational movement in this one direction.

In cases where the term "a" and corresponding grammatical adjustments to the genus of the designating element coming after the term in the specification and claims is used, this term encompasses the singular and plural of the designating element. As a rule, the term "a" and corresponding grammatical adjustments to the designating element following the term do not rule out the provision of several elements. A used numerical word (two, three, four, etc.) encompasses the possibility that more elements than designated by the used numerical word can be present.

The head-side surface preferably comprises a spatial boundary of the head. It can be provided that the device not extend over the head-side surface.

The head-side surface is preferably a cohesive handling surface of the device, which an assembler can use, for example to press the device into a mounting hole.

In the sense of the invention, the term "cohesive" encompasses a surface that can exhibit recesses, so that the surface can have several surface sections, wherein recesses or passage openings can be formed between the surface sections. However, a path from any desired point of the cohesive surface to another desired point of the surface can be found.

The head-side surface is preferably projection-free in design in the direction opposite the clip surface. In the sense of the invention, the term "projection-free" means that the head-side surface is essentially flat in design, in particular on the edges. The head-side surface can essentially exhibit no local or global maxima, i.e., the surface can be free of elevations. The head-side surface essentially exhibits a boundary opposite to the clip surface.

In a preferred embodiment, the device is smooth at least at the edge of the head-side surface. It is especially preferred that at least the edge of the head-side surface exhibit no projections or bending sections joined with an arm, which are bent away from the clip surface (22; 122). Conceivable as a result are embodiments in which elevations or depressions or bulges are provided within the head-side surface, i.e., spaced apart from the edge, so as to increase the bending stiffness of the head.

A head bending section or the leg bending section preferably encompasses a bend around the bending axis allocated thereto of more than 90°. In a preferred embodiment, the head bending section encompasses a bend of roughly 120° to roughly 200°, in particular of roughly 140° to roughly 190°, especially preferably of roughly 160° to roughly 190°, and very especially preferably of roughly 180°. A leg bending section preferably encompasses a bend of more than 90°. In a preferred embodiment, the leg bending section encompasses a bend of roughly 120° to roughly 200°, in particular of roughly 140° to roughly 190°, especially preferably of roughly 160° to roughly 190°, and very especially preferably of roughly 180°.

In the presence of a head bending section, the additional, second bending section to the head bending section, which can be regarded as the first bending section, preferably encompasses a bend of more than roughly 30°, especially preferably of more than roughly 35°, especially preferably of more than 40°. The additional bending section can be adjoined by a straight section without a curvature or bend. In particular, the arm can be joined with the additional bending section by another, third bending section located between the straight section and the arm; the additional (third) bending section located between the straight section and arm can directly adjoin the arm. It is especially preferred that the third bending section be bent around a bending axis parallel to the second bending axis, i.e., to the bending axis of the third bending section. It is especially preferred that the third bending section encompass a bend of more than roughly 10°, especially preferably of more than 30°, especially preferably of roughly 35°, especially preferably of less than 50°, and especially preferably of less than 40°.

The head bending section or leg bending section directly adjoins the head-side surface or leg, which extends from the head-side surface. The head bending section or leg bending section can be directly joined with the head-side surface or leg. A straight section can extend between the additional bending section and head bending section, and in particular correspond to the width of a retaining arm in an extension away from the head bending section or leg bending section. In particular, the straight section between the head bending section or leg bending section and the additional bending section can correspond to the width of the head bending section or leg bending section, in particular in a direction of extension transverse to the direction of extension away from the head bending section or leg bending section. The additional bending section and the arm can preferably exhibit essentially the same width. The additional bending section and the arm can essentially lie in a plane, in which lie the surface normal of the arm and the additional bending section and/or the straight section located between the head bending section or leg bending section and the additional bending section. In particular, the straight section can directly adjoin the head bending section or leg bending section. The additional bending section can directly adjoin the straight section.

In the presence of a leg bending section, the additional, second bending section to the leg bending section, which can be regarded as the first bending section, preferably encompasses a bend of more than roughly 10°, especially preferably of more than 30°, especially preferably of roughly 35°, especially preferably of less than 50°, and especially preferably of less than 40°.

In cases where the invention introduces the term "roughly" as a numerical indication, the specifically indicated number can also encompass up to a 10% deviation or in particular an angular range of +/−10° around the specifically indicated numerical value.

The head section is preferably bent in the direction toward the end of the device spaced apart from the head, i.e., toward a foot area of the device. Starting at the head-side surface, the head bending section can exhibit a curvature, in which the head bending section runs at least partially in the direction toward the foot area of the device. As a result, it can be ensured that the head of the device according to the invention will not receive an additional extension in height. In this preferred embodiment, a bend from the head in the form of a head bending section then takes place in the direction toward the longitudinal extension of the device. The head bending section can be spaced apart in the direction from the head, in particular relative to a shaft area, bent toward the latter.

The leg bending section preferably exhibits a bend that is bent back in the direction toward the leg. In a preferred embodiment, the leg bending section bends outwardly; as an alternative, however, it can also be inwardly bent. As a result of providing the first bending section as a leg bending section in particular with a 180° bend, the head-side surface can essentially be retained, and enlarging the head area of the device becomes unnecessary.

A preferred embodiment provides two arms, which are symmetrically arranged on the head. An especially reliable retention of the component to be held or of an element on which the component is to be held can be achieved in this way. The two arms can lie opposite one another in relation to a longitudinal extension of the device from the head to the foot area of the device. The two arms can be situated on the head in relation to each respective side, i.e., one to the right and the other to the left.

In a preferred embodiment, the head-side surface is not provided with a bending section joined with the arm, in particular is not provided with a head bending section bent away from the clip surface. This prevents the height of the device from becoming larger due to the bending section.

In the sense of the invention, the term "symmetry" or "symmetrical" can encompass a symmetry relative to one or more axes or a symmetry relative to a point or relative to a plane, wherein slight deviations from the purely geometric symmetry can be encompassed that do not significantly impair the functions.

In a preferred embodiment, the device is fabricated as a single piece out of a metal sheet, wherein sections of the metal sheet are bent relative to each other to give the device its three-dimensional shape. The device can be manufactured out of a metal sheet in a stamping and bending process. As a result, the device can be fabricated without any expensive joining processes, such as welding.

BRIEF DESCRIPTION OF THE SEVERAL VIEWS OF THE DRAWINGS

The invention will be explained in more detail below based on drawings, which show embodiments of the invention. Shown therein on.

DETAILED DESCRIPTION OF THE INVENTION

Figure 1:
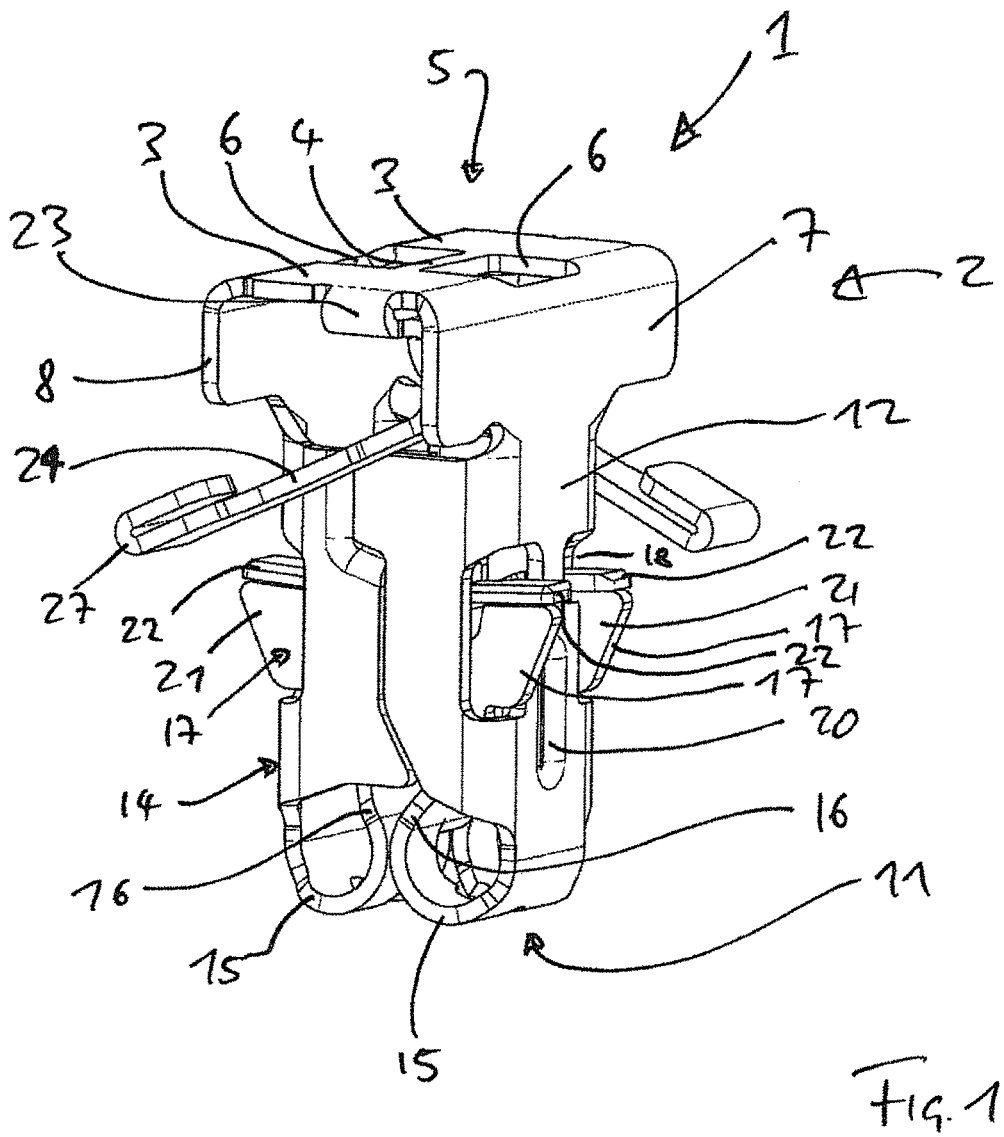
FIG. 1 is an isometric view of a device for holding a component according to a first embodiment.
Figure 2:
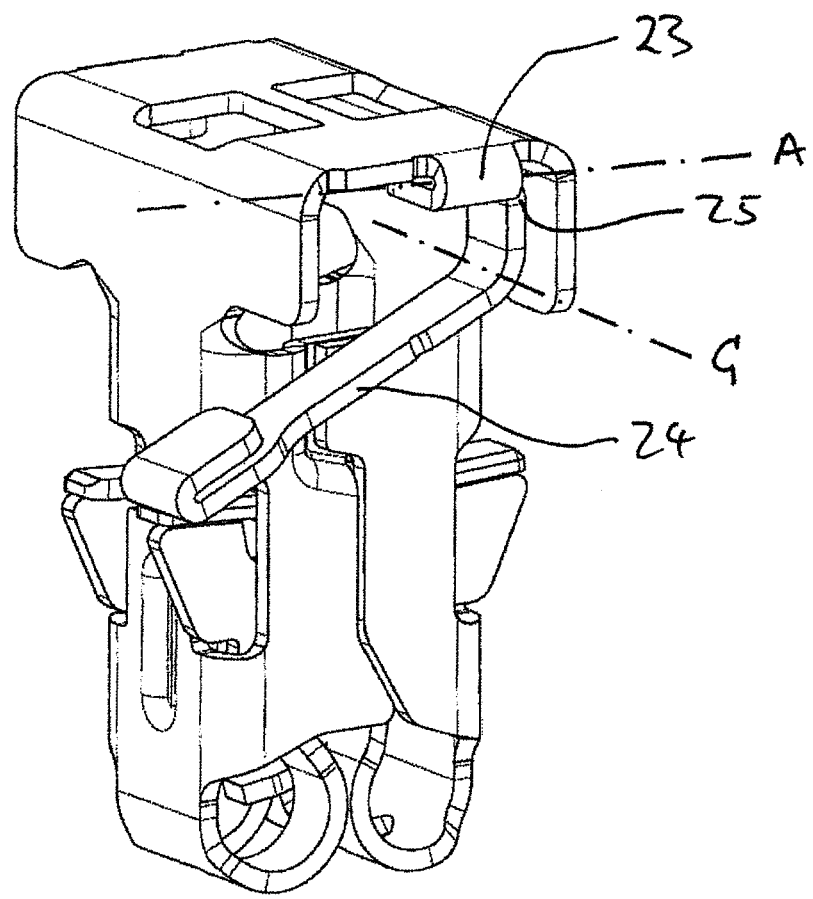
FIG. 2 is another isometric view of the device according to FIG. 1.
Figure 3:
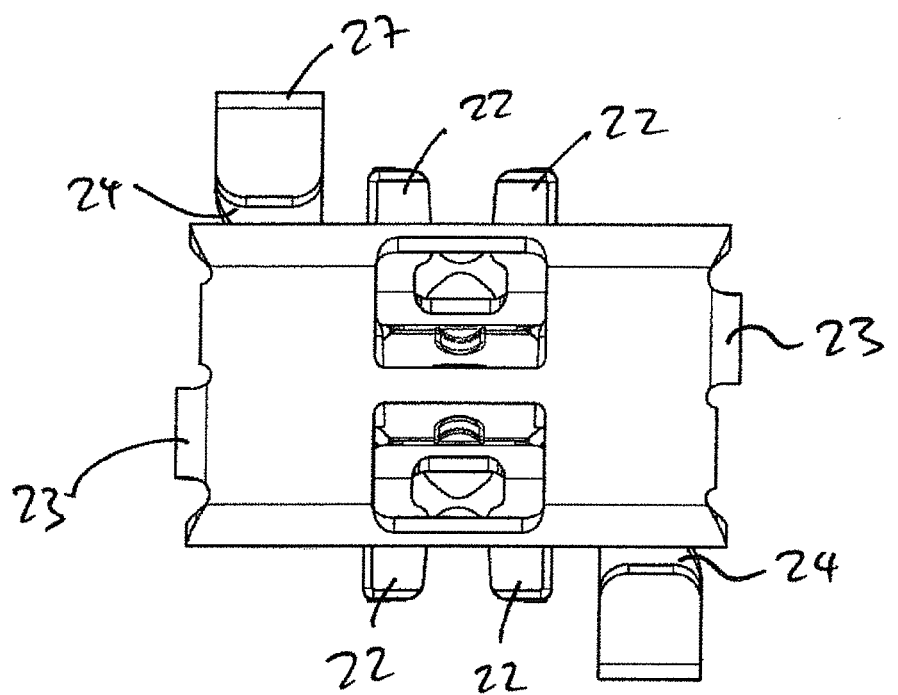
FIG. 3 is a top view of the device according to FIG. 1.
Figure 4:
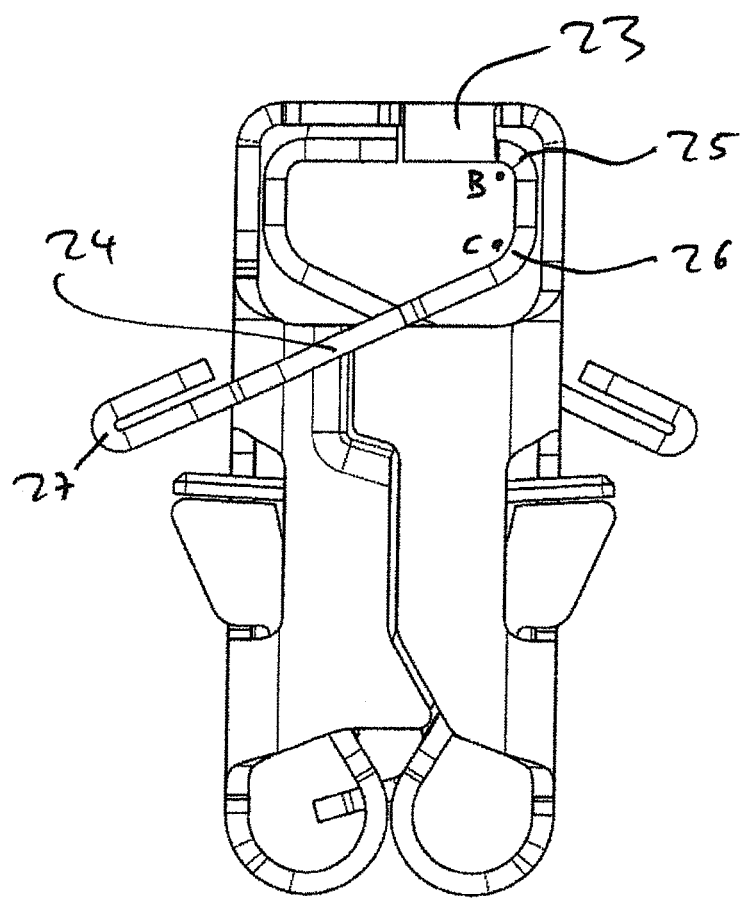
FIG. 4 is a side view of the device according to FIG. 1.
Figure 5:
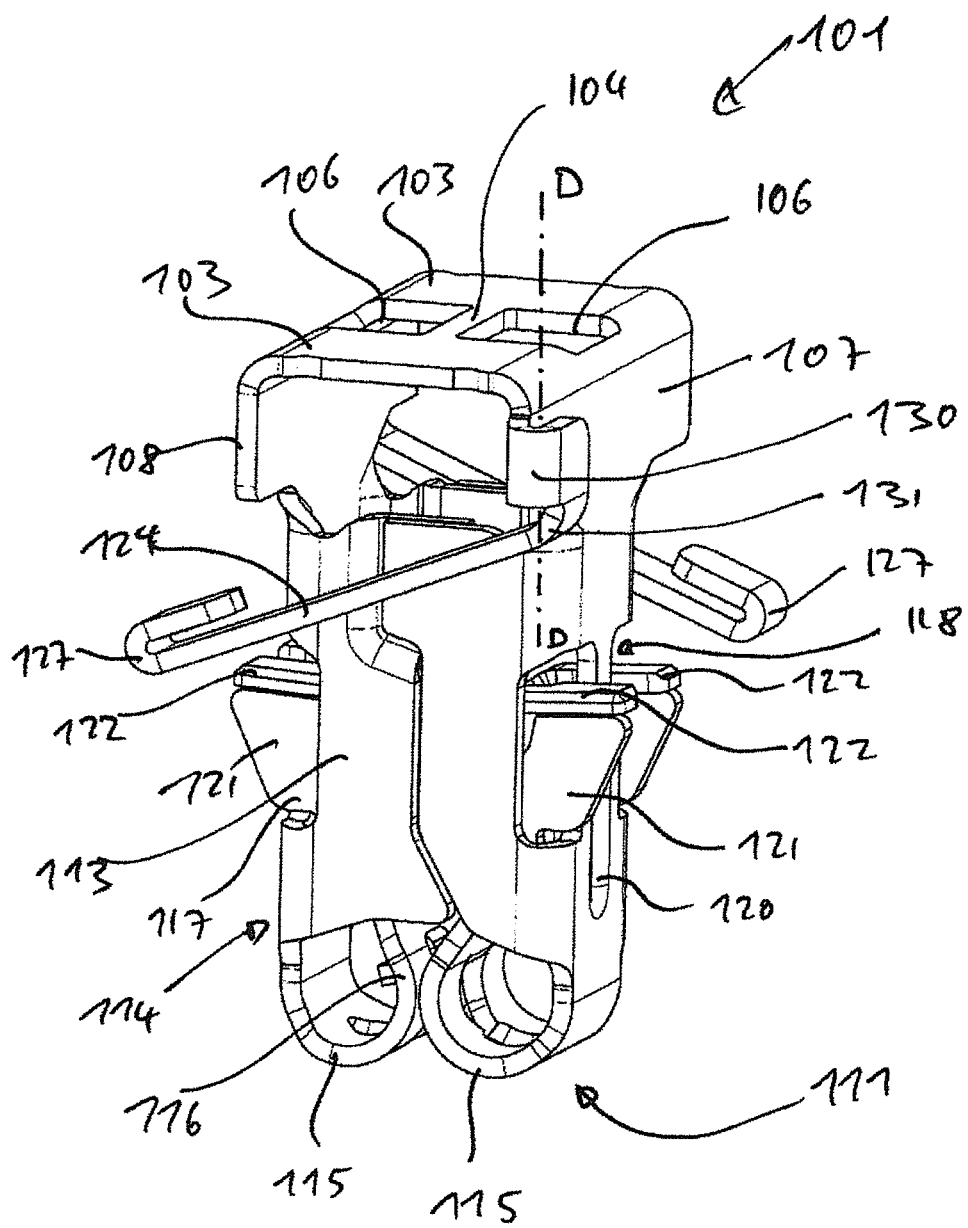
FIG. 5 is an isometric view of a device for holding a component according to a second embodiment.
Figure 6:
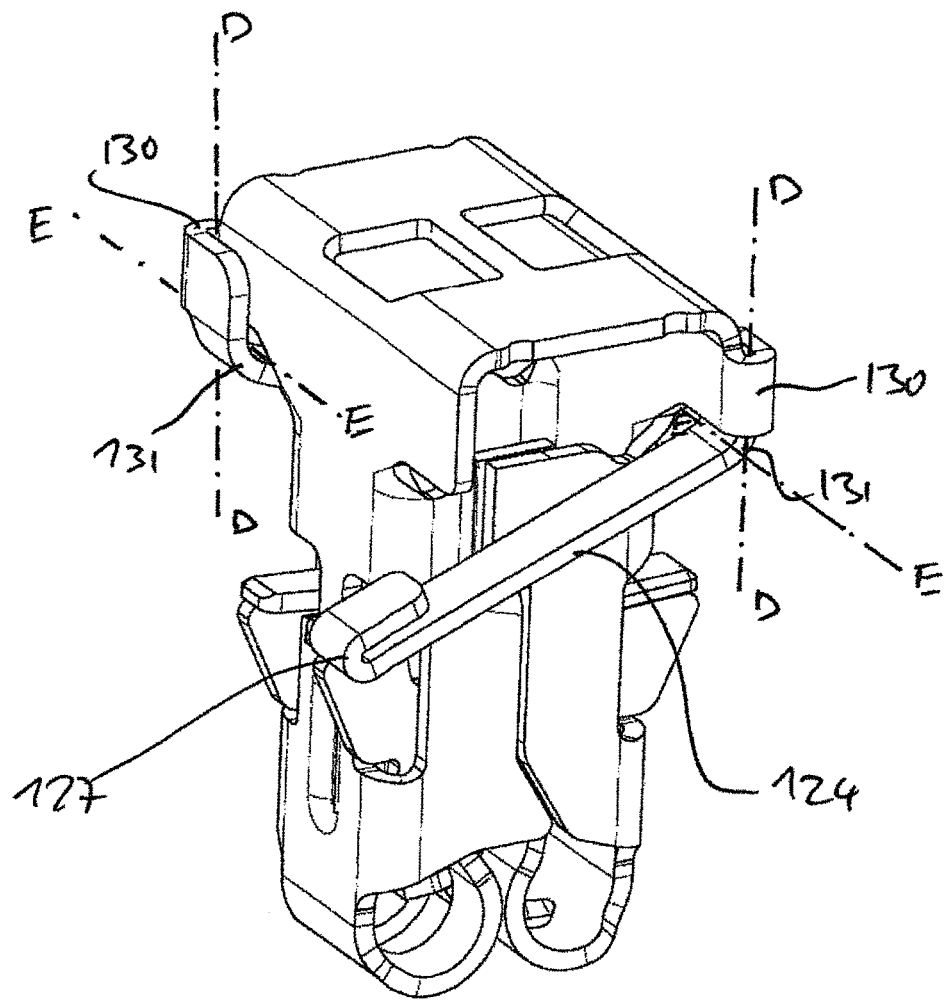
FIG. 6 is another isometric view of the device according to FIG. 5.
Figure 7:
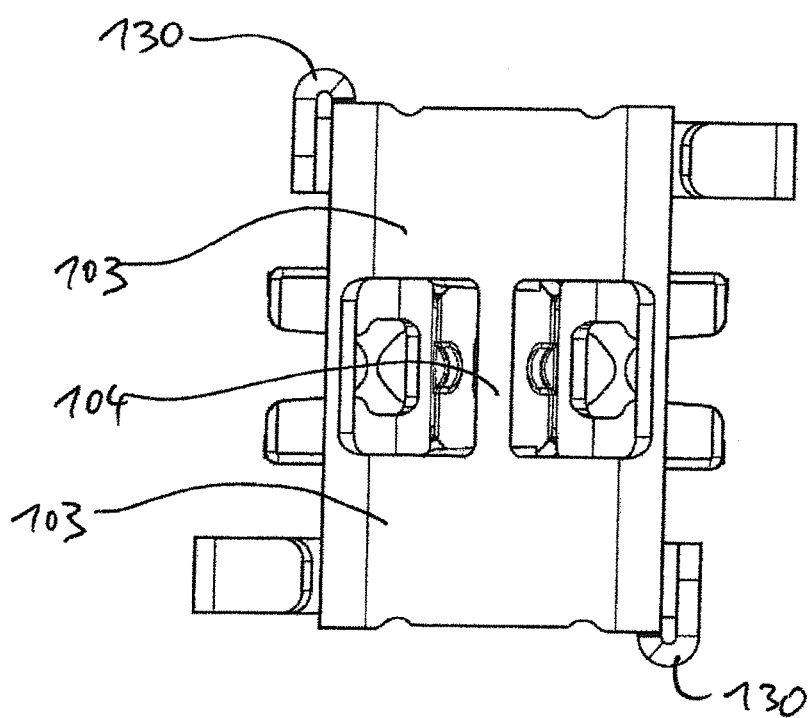
FIG. 7 is a top view of the device according to FIG. 5.
Figure 8:
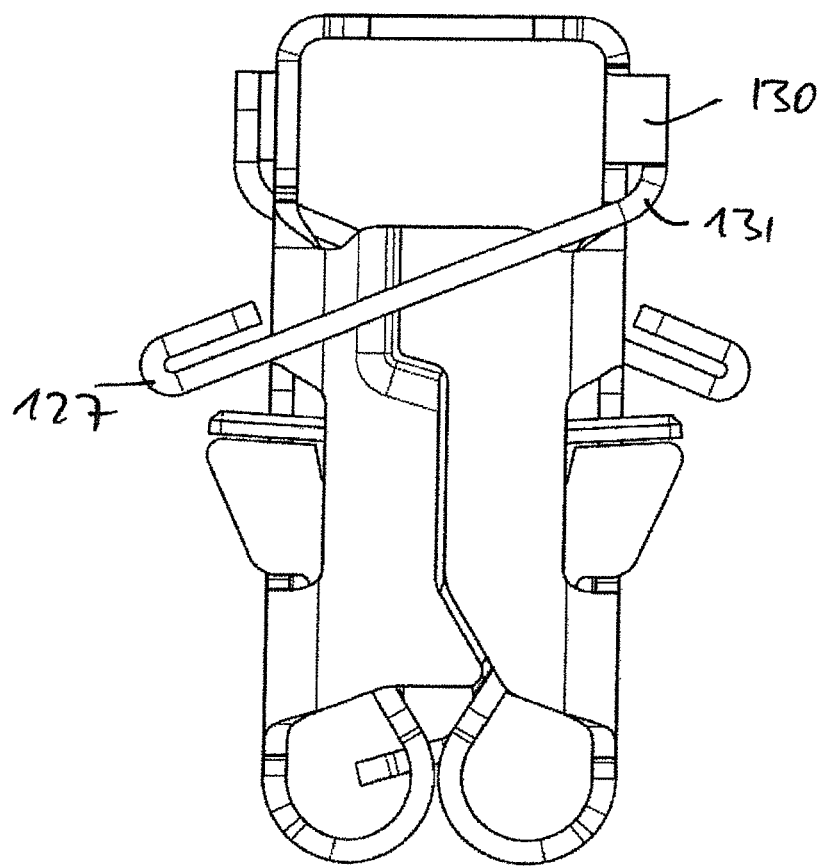
FIG. 8 is a side view of the device according to FIG. 5.

FIG. 1 presents an isometric view of a device 1 made out of a metal sheet in a stamping and bending process for holding a component according to a first exemplary embodiment. In the area of a head 2, the device 1 according to FIG. 1 exhibits two flat head webs 3, which are essentially rectangular in shape. The head webs 3 are joined by means of a connecting web 4. The head webs 3 and connecting web 4 form a cohesive head-side surface 5, which can be used as a handling surface. Head recesses 6 are formed between the head webs 3 and connecting web 4. Legs 7, 8 essentially aligned at a right angle to the respective head web 3 or head-side surface 5 are molded onto the head-side surface 5 along the longitudinal edges of the head webs 3. The two legs 7, 8 together with a head web 3 form a U-shaped profile, which can result in a high stiffness in the area of the head 2. A respective shaft arm 12, 13 extending into a shared foot area 11 adjoins the legs 7, 8. In the foot area 11, the shaft arms 12, 13 comprising a shaft 14 transition into bending sections 15, with which a respective section 16 is guided back into the shaft 14. The width of a bending section 15 makes it possible to adjust the spring properties of the section 16, wherein a bead can also be formed in the section 16 to stiffen the latter.

Each section 16 has molded onto it a pair of projections 17, which in the arrangement depicted on FIG. 1 representing a relaxed state of the device extend through windows 18 formed in the central area of the shaft 14 and beyond the shaft 14 to the outside. Remaining between the windows 18 of the shaft 14 is a web 19, the flight of which incorporates a respective bead 20 for stiffening the respective shaft area. Each projection consists of a side section 21 that extends laterally in the longitudinal direction of the shaft arm 12, 13 and is fastened to the section 16, and a clip surface 22 that is aligned essentially perpendicular to the side section 21 and connected with the respective side section 21 by way of a winding. The clip surfaces 22 extend toward each other. The outwardly directed outer edges of the side sections 21 are beveled in the direction of the foot area 11, so that the shaft arms 12, 13 shaft 14 can be introduced through a mounting hole adjusted to its cross section by applying a relatively slight mounting force.

FIGS. 1 to 4 show an embodiment of a device according to the invention in which a head bending section 23 is formed on the head-side surface 5. The head bending section 23 borders the head-side surface 5, and is bent in such a way that the surface in the head bending section 23 that continues relative to the head-side surface 5 is bent in the direction toward the foot area 11. The head bending section 23 encompasses a bend of roughly 180°, and thus leads into an area underneath the head-side surface 5. The head bending section 23 joins the head-side surface 5 with an elastic arm 24. The elastic arm 24 is joined with the head bending section 23 by means of another bending section 25, whose bending axis runs roughly at 90° relative to the bending axis of the head bending section 23. While the bending axis A (see FIG. 2) of the head bending section 23 runs parallel to the extension of the head-side surface 5 that joins the legs 7, 8, the bending axis B (see FIG. 4, where the bending axis runs perpendicular to the paper plane) of the additional bending section 25 runs parallel to an extension of the head-side surface 5 in the direction between the two head bending sections 23. The bending axes A, B include an angle of roughly 90° with each other. Further provided for joining the additional bending section 25 with the elastic arm 24 is another bending section 26, whose bending axis C (see FIG. 2) runs essentially parallel to the bending axis of the additional bending section 25.

The exemplary embodiment shown on FIGS. 1 to 4 provides two elastic arms 24, which extend in a direction that essentially corresponds to the extension of the direction of the clip surfaces 22.

A bending section 27 is formed at the end side, spaced apart from the connection between the elastic arm 24 and the head-side surface 5, and leads one end of the elastic arm 24 back to the elastic arm 24.

FIGS. 5 to 8 present another embodiment of the device according to the invention. In the additional embodiment, components that mirror the components from the embodiment depicted on FIGS. 1 to 4 in terms of their function are marked with the same reference numbers increased by a value of 100. The second embodiment will be described below essentially as relates to how it differs from the first embodiment.

FIGS. 5 to 8 depict an embodiment of a device according to the invention in which a leg bending section 130 is molded onto the legs 107, 108. The leg bending section 130 is joined with the leg 107, 108 on one side of the leg 107, 108 that extends roughly 90° relative to the head-side surface 105. The leg bending section is bent around the bending axis D (see FIGS. 5, 6) by 180°. The leg bending section 130 is used to join the leg 107, 108 with an elastic arm 124. Provided between the leg bending section 130 and elastic arm 124 is another bending section 131, which is bent around the second bending axis E (see FIG. 6), which runs at an angle of roughly 90° relative to the bending axis D of the leg bending section 130. While the bending axis D of the leg bending section 130 runs perpendicular to the extension of the head-side surface 105, the bending axis E of the additional bending section 131 runs parallel to an extension of the leg 107, 108.

In the exemplary embodiment shown on FIGS. 5 to 8, two elastic arms 124 are provided, which extend in a direction that essentially corresponds to the extension of the direction of the clip surfaces 122.

The invention claimed is:

1. A device for holding a component, wherein the device comprises a clip, which has a head and at least one clip surface for abutment against the component to be held or an element on which the component is to be held, wherein the at least one clip surface faces the head, and is spaced apart from the head, and the head exhibits a head-side surface, and is joined with one or more arms, which are designed for abutment against the opposite side of the component to be held provided for the at least one clip surface to abut against or the element on which the component is to be held, characterized in that a) the head-side surface has formed upon it a head bending section, which is bent around a first bending axis and bent in a direction toward an end of the device spaced apart from the head, and which is joined with an arm, wherein a connection between the head bending section and arm comprises another bending section, which is bent around a second bending axis that runs at an angle of more than 0° relative to the first bending axis of the head bending section, and/or
   b) the head-side surface is joined with a leg, which extends at an angle of more than 0° relative to the head-side surface, and has formed upon it a leg bending section that is bent around a first bending axis and joined with an arm, and the arm is joined with the leg bending section by means of another bending section, which is bent around a second bending axis that runs at an angle of more than 0° relative to the first bending axis of the leg bending section.

2. A device for holding a component, wherein the device comprises a clip, which has a head and at least one clip surface for abutment against the component to be held or an element on which the component is to be held, wherein the at least one clip surface faces the head, and is spaced apart from the head, and the head exhibits a head-side surface, and is joined with one or more arms, which are designed for abutment against the opposite side of the component to be held provided for the at least one clip surface to abut against or the element on which the component is to be held, characterized in that a) the head-side surface has formed upon it a head bending section, which is bent around a first bending axis and joined with an arm, wherein a connection between the head bending section and arm comprises another bending section, which is bent around a second bending axis running at an angle in excess of 0° relative to the first bending axis of the head bending section, and the head-side surface exhibits no bending section joined with the arm, which is bent away from the at least one clip surface, and/or b) the head-side surface is joined with a leg, which extends at an angle of more than 0° relative to the head-side surface, and has formed upon it a leg bending section that is bent around a first bending axis and joined with an arm, and the arm is joined with the leg bending section by means of another bending section, which is bent around a second bending axis that runs at an angle of more than 0° relative to the first bending axis of the leg bending section.

3. The device according to claim 1, characterized in that the head-side surface is a spatial boundary of the device.

4. The device according to claim 1, characterized in that the head-side surface is a cohesive handling surface.

5. The device according to claim 1, characterized in that the head-side surface is smooth in design in a direction opposite the at least one clip surface.

6. The device according to claim 1, characterized in that the head bending section and/or the leg bending section comprises a bend by more than 90°.

7. The device according to claim 1, characterized in that the leg bending section exhibits a bend that is bent back in a direction toward the leg.

8. The device according to claim 1, characterized in that an additional bending section is bent by more than 30° around the second bending axis.

9. The device according to claim 1, characterized in that two arms are provided, and symmetrically arranged on the head.

10. The device according to claim 2, characterized in that the head-side surface is a spatial boundary of the device.

11. The device according to claim 2, characterized in that the head-side surface is a cohesive handling surface.

12. The device according to claim 2, characterized in that the head-side surface is smooth in design in a direction opposite the at least one clip surface.

13. The device according to claim 2, characterized in that the head bending section and/or the leg bending section comprises a bend by more than 90°.

14. The device according to claim 2, characterized in that the leg bending section exhibits a bend that is bent back in a direction toward the leg.

15. The device according to claim 2, characterized in that an additional bending section is bent by more than 30° around the second bending axis.

16. The device according to claim 2, characterized in that two arms are provided, and symmetrically arranged on the head.

17. The device according to claim 3, characterized in that the head-side surface is a cohesive handling surface.

18. The device according to claim 3, characterized in that the head-side surface is smooth in design in a direction opposite the at least one clip surface.

19. The device according to claim 3, characterized in that the leg bending section exhibits a bend that is bent back in a direction toward the leg.

20. The device according to claim 3, characterized in that two arms are provided, and symmetrically arranged on the head.

\* \* \* \* \*